Jan. 5, 1943. O. MITCHELL 2,307,287
RECLAIMING MECHANISM FOR COTTON EXTRACTING AND CLEANING MACHINES
Filed Nov. 30, 1940
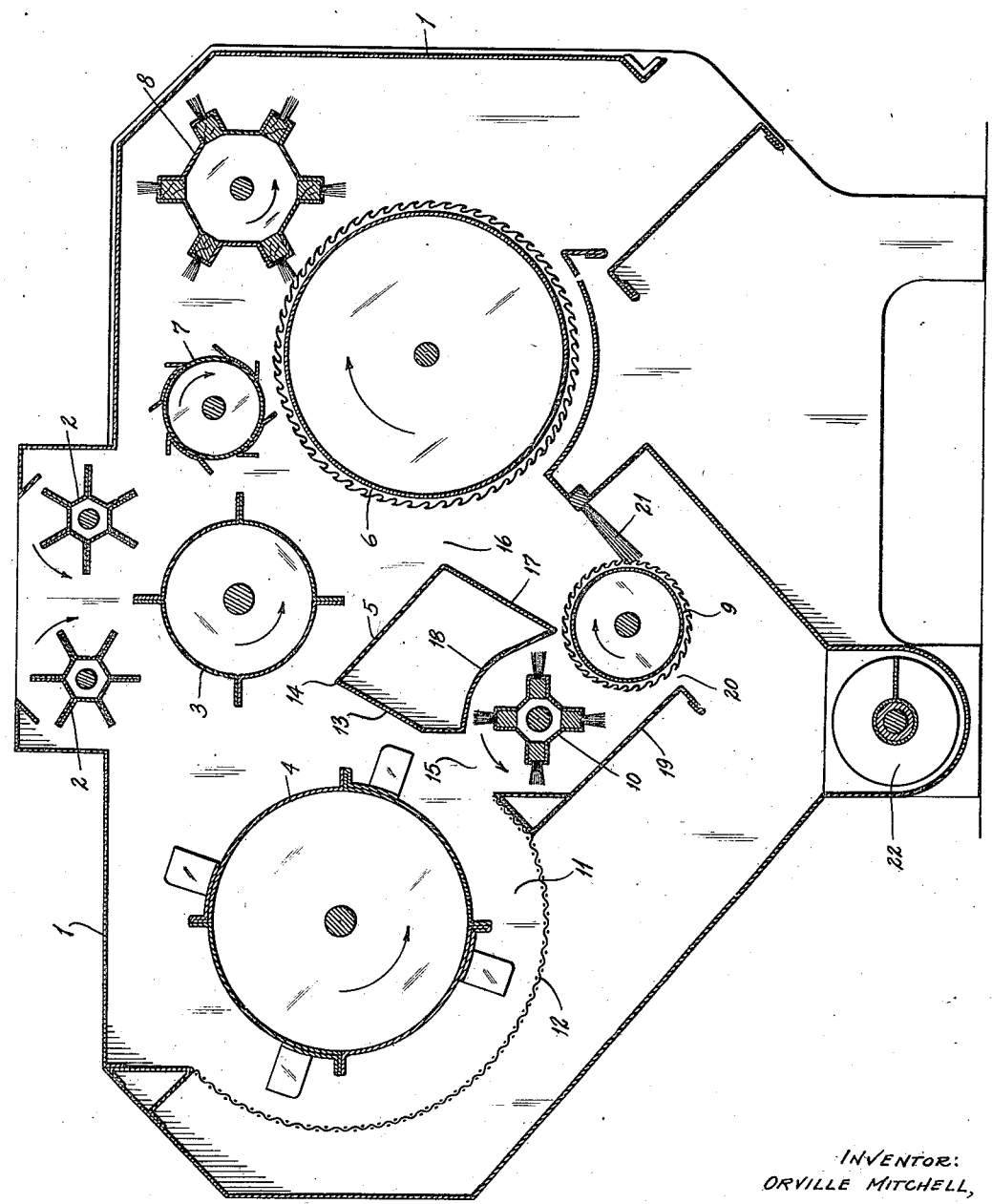
INVENTOR:
ORVILLE MITCHELL,
BY Bruce S. Elliott,
ATTORNEY.

Patented Jan. 5, 1943

2,307,287

UNITED STATES PATENT OFFICE 2,307,287

RECLAIMING MECHANISM FOR COTTON EXTRACTING AND CLEANING MACHINES

Orville Mitchell, Dallas, Tex., assignor to John E. Mitchell Company, Dallas, Tex., a corporation of Missouri Application November 30, 1940, Serial No. 367,898

16 Claims. (Cl. 19—37)

This invention has for its general object an improvement in the means for transferring reclaimed cotton removed from the teeth of a reclaiming saw to the teeth of the main extracting saw cylinder, in the operation of a cotton extracting, cleaning and reclaiming machine.

There are two different methods in use for accomplishing the above operation. According to one method, the extracting saw cylinder itself does the doffing. Such an arrangement is illustrated in the Mitchell Patent No. 2,005,265. The two saw cylinders are placed in close juxtaposition, with their opposed surfaces running in the same direction, and with the main saw cylinder running at a much higher peripheral speed than the reclaiming saw. It is this speed differential which effects the transfer of cotton locks from the teeth of the reclaiming saw to the teeth of the extracting saw.

This tooth-to-tooth doffing method has two defects, which I will briefly indicate. First, it is often the case that the locks of cotton are very green and sappy and become smeared on the teeth of the reclaiming saw so tightly that the teeth of the extracting saw will not completely remove them; fouling of the reclaiming cylinder results, causing waste of cotton. Second, sometimes a hull, especially if green or flabby, becomes impaled so securely on the teeth of the reclaimer that it fails to fall off through the hull discharge gap and is, instead, carried around with the reclaimed cotton locks and presented to the teeth of the extracting saw. Whenever this occurs, the hull is roughly treated between the opposed toothed surfaces, and breaking and shaling result, putting into the cotton stream small hull particles which cannot be completely removed, thereby lowering the grade of the conton.

According to a second method, a separate doffer is employed for removing the cotton from the reclaiming saw, and such a doffer is shown in Mitchell Patent No. 1,613,242.

Both of the disadvantages alluded to above can be overcome by the use of a separate doffer, especially if it is equipped with horse hair brushes, which ensure a more intimate stripping of the saw teeth than is possible with another saw cylinder. That is to say, with the right kind of doffer, even green and damp locks are removed from the reclaiming saws. Moreover, the use of a separate doffer permits the extracting cylinder and the reclaiming cylinder to be moved apart, so that there is never any crushing and grinding of the hulls between their opposed surfaces.

The present invention relates to that type of machine in which a separate doffer is employed for removing reclaimed cotton from the reclaiming saw, but differs from all prior machines known to me in the disposition made of the reclaimed cotton and impaled hulls, if any, after their removal by the doffer from the reclaiming saw.

Hitherto, all doffers for the purpose indicated have been so positioned as to project the reclaimed cotton in as direct a path as possible from the reclaiming saw to the teeth of the extracting cylinder, either with or without an auxiliary directing cylinder. This direct transfer of the cotton has invariably resulted in presenting the reclaimed locks to the extracting saw teeth at an unfavorable or disadvantageous angle, resulting in a certain amount of bouncing off of the locks on the one hand or conflict with the main cotton stream on the other. These faults are inherent in any system that involves the direct transfer of the reclaimed cotton from the reclaiming saw to the main extracting cylinder. This is due to the size of the working space to which the reclaiming saw and doffer are necessarily limited, and, so far as I know, cannot be avoided by any feasible arrangement of the various parts.

It is characteristic of my invention that therein I entirely abandon the effort to transfer the reclaimed cotton directly to the extracting cylinder, and cause said transfer to be made indirectly by returning the reclaimed cotton to the preparatory cleaning chamber.

The invention is illustrated in the accompanying drawing, in which the view is a cross-section through a machine provided with my improvements, the conventional driving mechanism being omitted, and the direction of rotation of the various parts being indicated by arrows applied thereto.

Referring to the drawing, the numeral 1 indicates the casing of the machine, in which are mounted feeding rollers 2, a directing cylinder 3, a cleaning cylinder 4, a hull board 5, an extracting cylinder 6, a kicker roll 7, a doffer 8 for the extracting cylinder, a reclaiming saw 9, and a doffer 10 for the reclaiming saw. Considered broadly, all of the parts named are old and well-known in the art, and require no detailed description. I will now proceed to describe the novel features and the novel arrangement and operation of parts, which characterize my invention.

The cleaning cylinder 4 rotates in a chamber 11, which is formed in part by a curved screen 12 surrounding the lower portion of the cleaning cylinder, and in part by an extension 13 projecting rearwardly and downwardly from the upper end 14 of the hull board 5. The lower end of the screen 12, and the lower end of the extension 13 are separated from each other to provide an inlet opening 15 to the cleaning chamber 11, for a purpose to be presently described. The screen 12 and the extension 13 together constitute what I term the "floor" of the cleaning chamber.

The doffer 10 is of the brush type, and is located intermediate the reclaiming saw 9 and the inlet opening 15, and in operative relation to both. The lower end of hull board 5 provides with the rising side of the extracting cylinder 6 a hull discharge gap 16, through which hulls and trash, and cotton locks not engaged by the teeth of the extracting saws, may escape and pass down to be acted on by the reclaiming saw. Extending rearwardly from the lower end of the hull board 5 is a downwardly-inclined extension 17, the lower end of which lies in close proximity to the upper surface of the reclaiming saw 9, the extension 17 acting as a guard to prevent the hulls and lock cotton from being knocked over the reclaiming saw by the rapidly-revolving extracting cylinder and thus escape being acted on by the former to reclaim cotton escaping with the hulls and trash past the extracting cylinder. The extensions 13 and 17 are connected by a curved plate 18 which acts as a confining wall at one side of the doffer 10. Extending downwardly past the other side of the doffer 10 is a hull board 19, the lower end of which provides with the rising side of the reclaiming saw 9 a discharge gap 20 for the escape of hulls and trash past said reclaiming saw. At the opposite side of the reclaiming saw is located a brush 21, extending from end to end of the reclaiming saw in contact with the teeth thereof, and which operates to force lock cotton into engagement with the teeth of the saw while permitting hulls to be carried under the brush and be discharged into the trash conveyor 22.

The opening 15, in addition to permitting the cotton removed from the reclaiming saw 9 to be returned to the main stream of cotton and hulls in the cleaning chamber, also permits loose trash and hulls, too large to go through the screen 12, to escape down the hull board 19, through the gap 20 and into the conveyor 22. It is highly desirable to get rid of this loose, extraneous matter as soon as possible, that is, before it becomes entangled again with the fibers; hence, the opening 15 serves a very valuable function in this regard.

It will be observed that the housing member 18 and hull board 19 provide, in conjunction with the doffer 10, two passage-ways; one, on the upgoing side of the doffer, for the return of the reclaimed cotton from the reclaimer 9 to the cleaning chamber, and the other, on the downgoing side of the doffer, for the passage of the loose, extraneous matter from the cleaning chamber, falling through opening 15, past the reclaiming saw to the discharge gap 20. If occasionally locks of cotton also escape through the opening 15, no harm is done, as they will eventually be engaged and returned to the main stream by the actions of the reclaiming saw and doffer, respectively.

The double function of the opening 15, in conjunction with the passage-ways on either side of the doffer 10, permitting the passage on one side of the doffer of loose trash and hulls, while at the same time permitting the return to the main stream of cotton locks falling through the opening 15, and of the reclaimed cotton, is a distinctive feature of the invention.

In operation, seed cotton fed into the machine by the feeders 2 is engaged by the upper side of the directing cylinder 3 and thrown onto the cleaning cylinder 4, which carries it around over the screen 12 and throws it up into engagement with the lower portion of the directing cylinder 3 which in turn projects it down the hull board 5 into engagement with the teeth of the main extracting cylinder 6. Hulls, trash and cotton locks escaping through the discharge gap 16 pass to the reclaiming saw 9, which engages such cotton locks and carries them around to the zone of action of the brush doffer 10, where the reclaimed cotton is swept off of the reclaiming saw, together with any impaled hulls, and delivered through the opening 15 into the cleaning chamber 11, where it joins the main cotton stream and follows the course of the latter down the hull board 5 to the extracting cylinder 6.

It will be noted that the hull board 5 lies in a plane which is tangential to the surface of the lower portion of the extracting cylinder 6 on its rising side, and that, therefore, all cotton passing down said hull board will be projected against the extracting cylinder in a line which is tangential to the lower portion thereof. Long experience in the operation of machines of the type here involved has demonstrated that when a mixed stream of cotton and hulls is hurled with considerable force along such a tangential line, the cotton locks are readily impaled upon the teeth of the extracting saws, while the hulls will just as readily bounce off, thereby effecting a quick and sure separation of cotton and loose hulls. The value of this principle is fully recognized, and prior Mitchell patents, such for example as No. 2,005,265, show that machines have been designed to treat in the same manner the auxiliary stream of hulls and cotton which is thrown back by the kicker roll 7. In the instant case, this rejected stream of hulls and cotton passes over the top of the directing cylinder 3 into the cleaning chamber 11 and then back to the bottom of the said directing cylinder so as to be thrown, in the tangential line referred to, against the bottom portion of the extracting cylinder 6. Now what, so far as my interests are concerned, has always been done with the main stream of cotton and hulls, and what was subsequently managed to be done with the auxiliary stream of rejected hulls and cotton from the kicker roll, I now contrive to do with the cotton (and impaled hulls) removed from the reclaiming saw. That is to say, this third stream, consisting of reclaimed cotton, is now returned to the main cotton stream so that it can be delivered to the extracting cylinder in the tangential line referred to. The advantages of my novel arrangement may be briefly summarized as follows:

First, the reclaiming saw is sufficiently removed from the main extracting cylinder to avoid breaking and shaling hulls between them; second, a brush doffer is employed for stripping the teeth of the reclaiming saw, thereby effecting a much better removal of green, sappy cotton than would be possible if the extracting saw itself were used for doffing; third, reclaimed cotton is returned to the main stream, and travels along with the main stream, instead of in a direction that would conflict with the main stream; four, the reclaimed cotton, with such hulls as may be mixed in it, is presented to the saw teeth of the extracting cylinder at the point and angle most advantageous for secure engagement by the teeth, and most advantageous for rapid separation from the loose hulls; and five, the action that occurs when, as frequently happens, a lock of cotton caught and saved by the reclaimer teeth has a hull clinging to it. According to the old method, such a cotton lock, with its hull still adhering thereto, would be thrown directly against the teeth of the extracting cylinder. With my present arrangement, the cotton lock and adhering hull would be doffed into the cleaning chamber, where first the cleaning cylinder 4 and then the directing cylinder 3 each act on it, knocking it loose from its hull and making the subsequent separation at the main extracting cylinder a simple matter.

With reference to this last feature, it is characteristic of my invention that the floor of the cleaning chamber extends entirely around the lower portion of the cleaning cylinder 4 so that, in the preferred arrangement illustrated, its inner end, which coincides with the upper end 14 of hull board 5, lies in a horizontal plane passing substantially through the center of the cleaning cylinder. This arrangement provides ample space beyond the inlet opening 15 for the action of the cylinders 4 and 3 in knocking loose cotton locks from adhering hulls to occur before the reclaimed cotton, along with the main cotton stream, is started on its path down the hull board 5 to be projected against the extracting cylinder in a direction tangential, or substantially so to the periphery of the extracting cylinder at the lower portion of its rising side.

I wish it understood, of course, that variations within reasonable limits could be made from the particular arrangement, construction and operation of parts which I have illustrated and described in this application without departing from the spirit of the invention as set forth in the claims.

I claim:

1. In a cotton extracting, cleaning and reclaiming machine, in combination with an extracting cylinder, a cleaning chamber, a hull board positioned to direct a stream of cotton from the cleaning chamber to said extracting cylinder in a direction tangential to the lower rising side of the extracting cylinder, and providing with the latter an opening for the escape of hulls, trash, and cotton locks not engaged by the teeth of said cylinder, a reclaiming saw located below said opening and operating to engage and reclaim cotton locks escaping through said opening with the hulls and trash, and a doffer adapted to remove the reclaimed cotton locks from the reclaiming saw and return them to said cleaning chamber in advance of the point where cotton therefrom passes onto said hull board.

2. In a cotton extracting, cleaning and reclaiming machine, in combination with an extracting cylinder, a cleaning chamber, a stationary hull board positioned to direct a stream of cotton from the cleaning chamber to said extracting cylinder in a direction tangential to the lower rising side of the extracting cylinder, and providing with the latter an opening for the escape of hulls, trash, and cotton locks not engaged by the teeth of said cylinder, a reclaiming saw located below said opening and operating to engage and reclaim cotton locks escaping through said opening with the hulls and trash, and a doffer adapted to remove the reclaimed cotton locks from the reclaiming saw and return them to said cleaning chamber in advance of the point where cotton therefrom passes onto said hull board.

3. In a cotton extracting, cleaning and reclaiming machine, in combination with an extracting cylinder, a cleaning chamber, a cotton cleaning and delivering cylinder operating therein, an inclined hull board for receiving and directing the main stream of cotton delivered from said cleaning chamber in a direction tangential to the rising side of said extracting cylinder, the upper end of said hull board being located in a horizontal plane passing through said cleaning and delivering cylinder, and the lower end thereof providing with the extracting cylinder an opening for the escape of hulls, trash and cotton locks not engaged by the teeth of said extracting cylinder, a reclaiming saw located below said opening and operating to engage and reclaim cotton locks escaping through said opening with the hulls and trash, and a doffer adapted to remove the reclaimed cotton locks from the reclaiming saw and return them to the main stream of cotton in advance of the point where the latter is delivered to the upper end of said hull board.

4. In a cotton extracting, cleaning and reclaiming machine, in combination with an extracting cylinder, a cleaning chamber, comprising a substantially semi-circular screen, a cotton cleaning and delivering cylinder rotating in its lower portion in concentric relation to said screen, an inclined hull board for receiving and directing the main stream of cotton delivered from said cleaning chamber to the rising side of said extracting cylinder, the upper end of said hull board being located in a horizontal plane passing through said cleaning and delivering cylinder, and the lower end thereof providing with the extracting cylinder an opening for the escape of hulls, said hull board having at its upper end a rear extension forming a part of the floor of said cleaning chamber but terminating short of the end of said screen below said cleaning and delivering cylinder to provide an inlet to the cleaning chamber, a reclaiming saw located below the lower end of said hull board and operating to engage and reclaim cotton locks escaping through said opening with the hulls and trash, and a doffer adapted to remove the reclaimed cotton locks from the reclaiming saw and return them through said inlet to the main stream of cotton in the cleaning chamber in advance of the point where the latter is delivered to the upper end of said hull board.

5. In a cotton extracting, cleaning and reclaiming machine in combination with an extracting cylinder, a cleaning chamber, comprising a substantially semi-circular screen, a cotton cleaning and delivering cylinder rotating in its lower portion in concentric relation to said screen, an inclined hull board for receiving and directing the main stream of cotton delivered from said cleaning chamber to the rising side of said extracting cylinder, the upper end of said hull board being located in a horizontal plane passing through said cleaning and delivering cylinder, and the lower end thereof providing with the extracting cylinder an opening for the escape of hulls, said hull board having at its upper end a rear extension forming a part of the floor of said cleaning chamber but terminating short of the end of said screen below said cleaning and delivering cylinder to provide an inlet to the cleaning chamber, a reclaiming saw located below the lower end of said hull board and operating to engage and reclaim cotton locks escaping through said opening with the hulls and trash, and a doffer adapted to remove the reclaimed cotton locks from the reclaiming saw and project them through said inlet into the main stream of cotton in the cleaning chamber in advance of the point where the cotton is delivered to the upper end of said hull board.

6. In a cotton extracting, cleaning and reclaiming machine, in combination with an extracting cylinder, a cleaning chamber, a cotton cleaning and delivering cylinder rotatably mounted therein, an inclined hull board for receiving and directing the main stream of cotton delivered from said cleaning chamber to the rising side of said extracting cylinder, the upper end of said hull board being located in a horizontal plane passing through said cleaning and delivering cylinder, and the lower end thereof providing with the extracting cylinder an opening for the escape of hulls, a reclaiming saw located below said opening, a floor for the cleaning chamber surrounding the lower portion of said cleaning and delivering cylinder terminating at the upper end of said hull board, embodying a screen in its construction, and provided with an inlet opening removed from the upper end of said hull board, and a doffer adapted to remove the reclaimed cotton locks from the reclaiming saw and project them through said inlet opening into the main stream of cotton in the cleaning chamber in advance of the point where the cotton is delivered to the upper end of said hull board.

7. In a cotton extracting, cleaning and reclaiming machine, in combination with an extracting cylinder, a cleaning chamber having an inlet opening, a cotton cleaning and delivering cylinder working in said chamber, a reclaiming saw, a doffer therefor positioned to project cotton removed from the reclaiming saw through said inlet opening, and means located beyond said inlet opening for delivering the reclaimed cotton together with the main stream of cotton from said cleaning chamber to said extracting cylinder in a fixed path tangential to the lower rising side thereof, and providing with said side of the extracting cylinder a discharge gap through which hulls, trash, and cotton locks not engaged by the extracting saws, may pass into engagement with said reclaiming saw.

8. In a cotton extracting, cleaning and reclaiming machine, in combination with an extracting cylinder, a cleaning chamber having an inlet opening, a cotton cleaning and delivering cylinder working in said chamber, a reclaiming saw, a doffer therefor positioned to project cotton removed from the reclaiming saw through said inlet opening, and means located beyond and extending above said inlet opening for delivering the reclaimed cotton together with the main stream of cotton from said cleaning chamber to said extracting cylinder in a fixed path tangential to the lower rising side thereof, and providing with said side of the extracting cylinder a discharge gap through which hulls, trash, and cotton locks not engaged by the extracting saws, may pass into engagement with said reclaiming saw.

9. A cotton extracting, cleaning and reclaiming machine comprising, in combination, an extracting cylinder, a cleaning chamber having an inlet opening, a cotton cleaning and delivering cylinder working in said chamber, a reclaiming saw, a doffer therefor positioned to project cotton removed from the reclaiming saw through said inlet opening, a hull board located beyond said inlet opening for delivering the reclaimed cotton together with the main stream of cotton from said cleaning chamber to said extracting cylinder, said hull board being inclined in a plane tangential to the lower rising side of said extracting cylinder and providing therewith a discharge gap at its lower end through which hulls, trash, and cotton locks not engaged by the extracting saws, may pass into engagement with said reclaiming saw, and a directing cylinder positioned to receive the combined streams of cotton delivered by said cleaning cylinder and project the same over said hull board toward the extracting cylinder.

10. In a cotton extracting, cleaning and reclaiming machine, in combination with an extracting cylinder, a cleaning chamber, a hull board positioned to direct a stream of cotton from the cleaning chamber to the rising side of the extracting cylinder and in a direction tangential thereto, and providing with the latter an opening for the escape of hulls, trash, and cotton locks not engaged by the teeth of said cylinder, a reclaiming saw located below said opening and operating to engage and reclaim cotton locks escaping through said opening with the hulls and trash, and means for removing the reclaimed cotton locks from the reclaiming saw and returning them to said cleaning chamber in advance of the point where cotton therefrom passes onto said hull board.

11. In a cotton extracting, cleaning and reclaiming machine, in combination with an extracting cylinder, a cleaning chamber, cotton delivering means operating therein, a hull board positioned to direct a stream of the delivered cotton to said extracting cylinder in a direction tangential to the rising side of the extracting cylinder, and providing with the latter an opening for the escape of hulls, trash, and cotton locks not engaged by the teeth of said cylinder, a reclaiming saw located below said opening and operating to engage and reclaim cotton locks escaping through said opening with the hulls and trash, and means for removing the reclaimed cotton locks from the reclaiming saw and returning them to said cotton stream in advance of the point where the latter is delivered to said hull board.

12. In a cotton extracting, cleaning and reclaiming machine, in combination with an extracting cylinder, a hull board positioned to deliver a main stream of mixed cotton and hulls to the extracting cylinder in a direction tangential to the rising side of the extracting cylinder, and providing with the latter an opening for the escape of hulls, trash, and cotton locks not engaged by the teeth of said cylinder, a reclaiming saw located below said opening and operating to engage and reclaim cotton locks escaping through said opening with the hulls and trash, and means for removing the reclaimed cotton locks from the reclaiming saw and returning them to the stream of mixed cotton and hulls prior to the delivery action thereof by said hull board, whereby the reclaimed cotton will be delivered to the extracting cylinder in the same direction as the main stream of cotton.

13. In a cotton extracting, cleaning and reclaiming machine, in combination with an extracting cylinder, means for delivering a main stream of mixed cotton and hulls to said extracting cylinder and for permitting the escape past the cylinder of hulls, trash, and cotton locks not engaged by the teeth of said cylinder, a reclaiming saw positioned and operating to engage and reclaim cotton locks from the escaping product, and means for removing the reclaimed cotton locks from the reclaiming saw and delivering them to the extracting cylinder in a fixed path tangential to the rising side of the latter.

14. In a cotton extracting, cleaning and reclaiming machine, in combination with an extracting cylinder, a cleaning chamber having an inlet opening, a cotton cleaning and delivering cylinder working in said chamber, a reclaiming saw, a doffer therefor, means located at the downgoing side of the doffer and forming therewith and with said reclaiming saw a passage-way extending from said inlet opening past said doffer and reclaiming saw through which hulls and trash escaping through said opening may pass out of the machine, means located at the rising side of the doffer and forming therewith a passage-way from the reclaiming saw to said opening through which reclaimed cotton removed from the reclaiming saw by the doffer passes into the cleaning chamber, and means located beyond said inlet opening for delivering the reclaimed cotton together with the main stream of cotton from said cleaning chamber to the rising side of said extracting cylinder and providing with the latter a discharge gap through which hulls, trash, and cotton locks not engaged by the extracting saws, may pass into engagement with said reclaiming saw.

15. In a cotton extracting, cleaning and reclaiming machine, in combination with an extracting cylinder, a cleaning chamber having an inlet opening, a cotton cleaning and delivering cylinder working in said chamber, a reclaiming saw, a doffer therefor, means located at the downgoing side of the doffer and forming therewith and with said reclaiming saw a passage-way extending from said inlet opening past said doffer and reclaiming saw through which hulls and trash escaping through said opening may pass out of the machine, means located at the rising side of the doffer and forming therewith a passage-way from the reclaiming saw to said opening through which reclaimed cotton removed from the reclaiming saw by the doffer passes into the cleaning chamber, and means located beyond and extending above said inlet opening for delivering the reclaimed cotton together with the main stream of cotton from said cleaning chamber to said extracting cylinder in a direction tangential to the lower rising side thereof, and providing with said side a discharge gap through which hulls, trash, and cotton locks not engaged by the extracting saws, may pass into engagement with said reclaiming saw.

16. In a cotton cleaning, extracting and reclaiming machine, in combination with an extracting cylinder, a cleaning chamber having an inlet opening, a cotton cleaning and delivering cylinder working in said chamber, a reclaiming saw, a doffer therefor, means located at the downgoing side of the doffer and forming therewith and with said reclaiming saw a passage-way extending from said inlet opening past said doffer and reclaiming saw through which hulls and trash escaping through said opening may pass out of the machine, means located at the rising side of the doffer and forming therewith a passageway from the reclaiming saw to said inlet opening through which cotton reclaimed by the reclaiming saw and removed therefrom by the doffer passes into the cleaning chamber, and means located beyond and extending above said inlet opening for delivering the reclaimed cotton together with the main stream of cotton from said cleaning chamber to said extracting cylinder in a fixed path tangential to the lower rising side thereof, and providing with the latter a discharge gap through which hulls, trash, and cotton locks not engaged by the extracting saws, may pass into engagement with said reclaiming saw.

ORVILLE MITCHELL,